May 1, 1951 A. TOMPKINS 2,551,305
KITCHEN CABINET
Filed Aug. 24, 1946 3 Sheets-Sheet 1

Inventor:
Alan Tompkins,
by Alfred E. Bobst.
His Attorney.

May 1, 1951 A. TOMPKINS 2,551,305
KITCHEN CABINET
Filed Aug. 24 1946 3 Sheets-Sheet 2

Inventor:
Alan Tompkins,
by Alfred E. Bobst
His Attorney.

May 1, 1951 — A. TOMPKINS — 2,551,305
KITCHEN CABINET
Filed Aug. 24, 1946 — 3 Sheets-Sheet 3
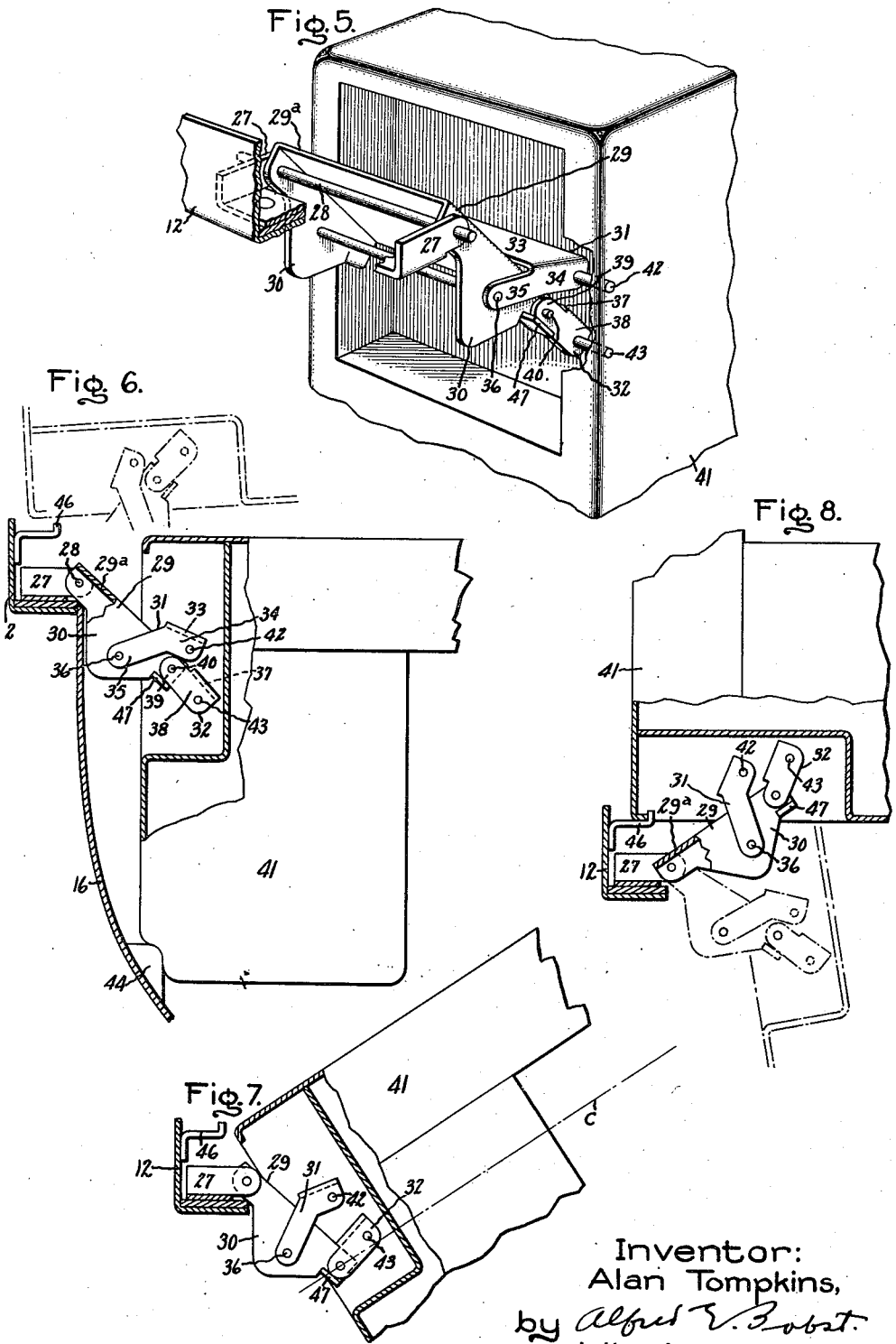
Inventor:
Alan Tompkins,
by Alfred V. Bobst
His Attorney.

Patented May 1, 1951

2,551,305

UNITED STATES PATENT OFFICE 2,551,305

KITCHEN CABINET

Alan Tompkins, Stratford, Conn., assignor to General Electric Company, a corporation of New York Application August 24, 1946, Serial No. 692,859

5 Claims. (Cl. 312—328)

1

The present invention relates to kitchen cabinets of the type comprising a base, the top of which provides a work table, and a cupboard supported above the base to provide storage shelves.

The object of my invention is to provide an improved construction and arrangement in a cabinet of this type and for a consideration of what I believe to be novel and my invention, attention is directed to the following specification and to the claims appended thereto.

Figure 1:
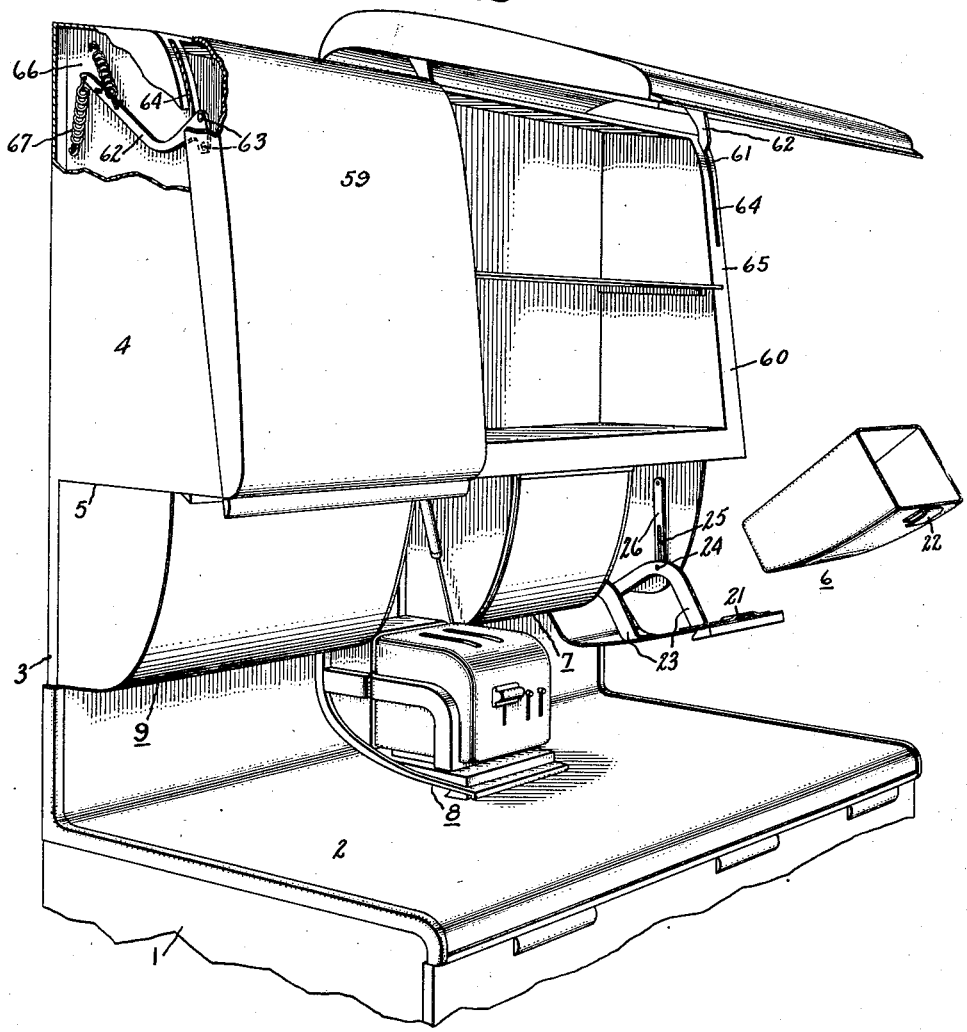
Figure 2:
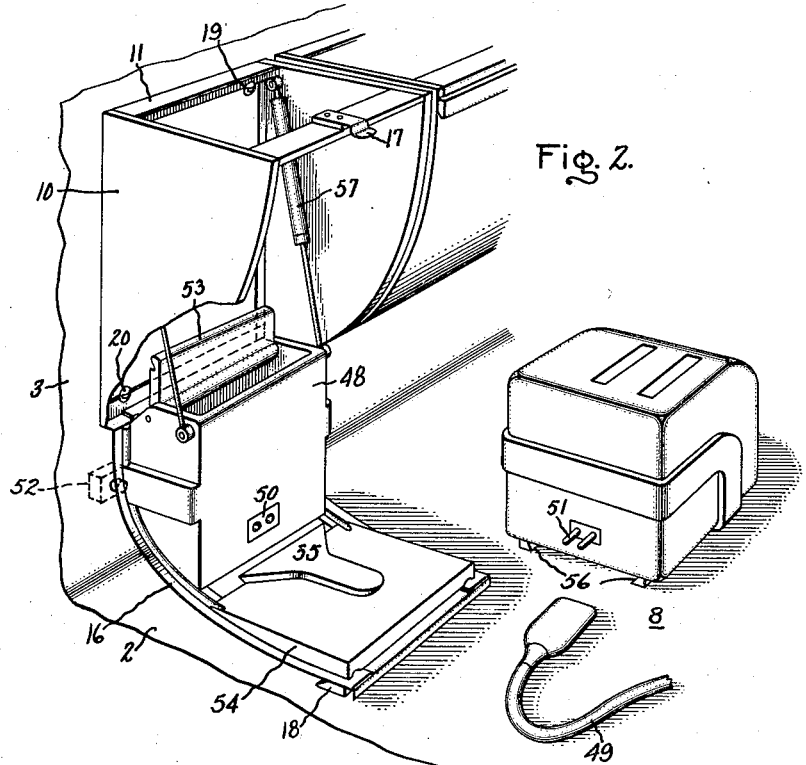
Figure 3:
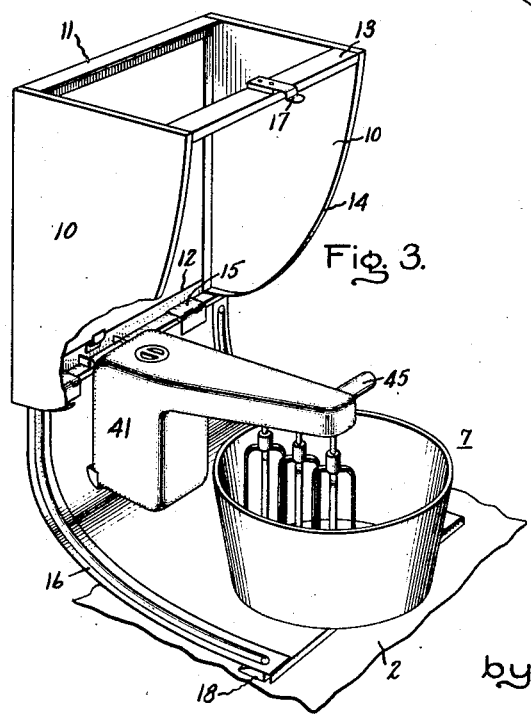
Figure 4:
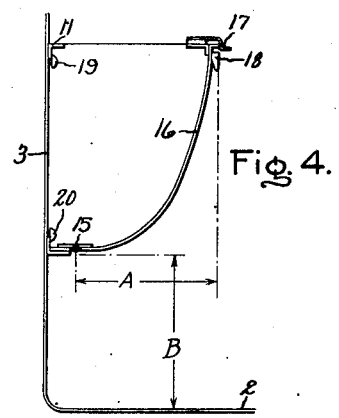

In the drawing, Fig. 1 is a perspective view of a cabinet embodying my invention, a portion of the base being broken away; Figs. 2 and 3 are perspective views of parts of the cabinet; Fig. 4 is a detail diagrammatic view, and Figs. 5, 6, 7 and 8 are views illustrating a hinge construction used in the cabinet.

Referring to the drawing, 1 indicates a cabinet base, the top of which defines a work table 2. The base may be of a height such that when supported on a floor, the work table is positioned the desired distance above the floor and it may be provided with suitable storage chambers, such as drawers, shelves or the like as found desirable. These are not shown in the drawing since their specific arrangement forms no part of the present invention.

The cabinet has a back wall 3 on which is supported a cupboard 4. Back wall 3 may be a wall of the cabinet or it may be a wall of a building on which the cabinet parts are mounted. Cupboard 4 is of a depth substantially less than that of the base so as to leave all the work table except the rear portion entirely free and open from above. The bottom wall 5 of the cupboard is spaced from the work table 2 and in the space between bottom wall 5 and the work table there is mounted a number of utensils, four being shown in the present instances numbered 6, 7, 8 and 9. The utensils may be of different types. Some may be in the form of receptacles and others may be in the form of electrical appliances. In the present instance and as typical, utensil 6 is a receptacle for a substance such as sugar, flour, or the like, utensil 7 is a food mixer, utensil 8 is a toaster, and utensil 9 is a receptacle for bread or the like.

Each utensil is carried by a framework detachably mounted on back wall 3 beneath wall 5. The frameworks are alike in structure except for length and are interchangeable in position on back wall 3. As to length, they may be made of a certain basic length and in multiples thereof. The framework structure is best shown in Fig. 3.

2

It comprises two side walls 10 connected top and bottom at the rear by cross straps 11 and 12 which may be L-shaped in cross section and at the top front edge by a strap 13. The front edges are curved rearwardly from top to bottom as indicated at 14. Attached to bottom angle strip 12 by a pair of hinges 15 is a cover 16 curved to conform to the curvature of side walls 10. It closes against the front edges of side walls 10 and is held closed by a suitable spring catch 17. Attached to the front upper edge of cover 16 is a handle 18 which may be in the form of an undercut strip extending throughout the width of the cover. The framework may be attached to back wall 3 in any suitable manner, the arrangement being such that it can be readily detached. In the present invention, it is shown as being hung on screws 19 at its upper end, the lower edge of strip 11 (see Fig. 2) fitting behind the heads of the screws and as being held at its lower end by screws 20. By removing screws 20 and loosening screws 19, a framework may be removed from back wall 3.

A feature of my construction is that I make the dimension B (Fig. 4) from the horizontal plane of hinges 15 to the top surface of table 2 equal to the dimension A from the vertical plane of the hinge point of the hinges to the vertical plane of the outer surface of handle 18 when the cover 16 is closed. By reason of this, an utensil or appliance attached to cover 16 and occupying a vertical position when the cover is closed will occupy a horizontal position when the cover is open with the handle 18 resting on the top surface of table 2. With this arrangement, an appliance such as a food mixer or a toaster mounted on a cover is brought to an exactly horizontal position on table 2 when the cover is swung open.

Each framework with a utensil or appliance suitably mounted thereon forms a unit adapted to be attached to the cabinet, mounting means suitable to meet the requirements of the particular utensil or appliance being provided. They may take various forms.

In the case of utensil 6, a receptacle, the cover is provided with a strap or clasp 21 with which a hook 22 on the receptacle engages to attach the receptacle to the cover. In this instance, it is desired not to bring the receptacle to a horizontal position when the cover is opened. Accordingly, curved arms 23 are attached to the cover and are pivoted with pins 24 positioned in slots 25 in strips 26 provided on the side walls of the framework. These serve to support the cover in a partly open position as shown in Fig. 1.

Utensil 7 is a food mixer. It is attached to the framework by a hinge construction which enables it to be placed in a vertical position as indicated in Fig. 8, in a horizontal position as shown in Fig. 3 and in full lines in Fig. 6, or in an intermediate position as shown in Fig. 7. The hinge structure comprises a pair of spaced ears 27 attached to angle strip 12 which carry a pivot pin 28 on which is pivoted a primary hinge member 29 comprising a plate 29a having depending end flanges 30 provided with openings through which pin 28 extends. Pivoted to end flanges 30 is a pair of toggle hinges 31 and 32. Hinge 31 comprises a top strap 33 having end flanges 34 on which are rearwardly extending ears 35 pivoted on the ends of a cross pin 36 carried by end flanges 30. Hinge 32 comprises a top strap 37 having end flanges 38 on which are rearwardly extending ears 39 pivoted on the ends of a cross pin 40 carried by flanges 30. The forward ends of hinges 31 and 32 are pivotally connected to the base 41 of the food mixer by pins 42 and 43.

In Figs. 3 and 6, the food mixer is shown as being positioned horizontally for use, the cover 16 being in the open position with its outer end resting on the top of table 2. It is held in this position by the lower rear edge of base 41 engaging a suitable bumper 44 on cover 16. Toggle hinges 31 and 32 occupy positions as best shown in Fig. 6, hinge 32 forming in substance a straight line continuation of the primary hinge member 29. With toggle hinges 31 and 32 remaining in their Fig. 6 positions, the mixer, by means of handle 45, can be raised to a vertical position, the hinge structure as a unit turning around pivot pin 28. When brought to a vertical position, it occupies first the position shown in dotted lines in Fig. 6. It may be then lowered somewhat to fasten the rear lower edge of base 41 over a hook 46 carried by cross strap 12 as shown in Fig. 8, the hinge members moving from the dotted line positions shown in Fig. 6 to the full line positions shown in Fig. 8. This serves to lock or hook the mixer in a neutral position. The mixer may be turned to its horizontal position by first lifting it on its hinges to disengage it from hook 46 and then lowering it around pin 28 as a pivot.

The mixer may be moved from a horizontal position to an intermediate angular position as shown in Fig. 7 by turning it about the pivot pins 36 and 40 of the toggle hinges 31 and 32. In Fig. 7, the dot and dash line C is a line through the center of pivot pin 40 and the center of gravity of the mixer. In moving from a horizontal position to an intermediate position, toggle hinge pin 43 moves from a position below line C to a position above line C. In this intermediate position, cross strap 37 of hinge 32 engages the upper side of the primary hinge member 29 which serves as a stop to limit turning movement of toggle hinges 31 and 32 on the primary hinge member. Since hinge point 43 is now above line C, the mixer is held in its intermediate position by its weight. Turning movement of toggle hinges 31 and 32 on the primary hinge member 29 in the opposite direction is limited by end lugs 47 which project outwardly from side flanges 30. The intermediate position for the mixer is useful in that it enables the user to lift beater elements of the mixer to a position above the mixing bowl but still positioned over it so that the material being mixed may drop back into the bowl. Also the beaters may be removed from the mixer while in its intermediate position for washing.

Utensil 8 is a toaster. It is detachably fastened to the horizontal portion of cover 16 and at its rear the cover is provided with a suitable casing 48 in which a cord set 49 for the toaster may be stored. The front wall of casing 48 may be provided with an electrical receptacle 50 to receive the prongs 51 of the toaster and the wiring arrangement may be such that when cover 16 is in its open position, the electrical receptacle is connected in circuit and when in its closed position the circuit is opened. To this end, the cover may actuate a push button switch 52 in wall 3 as indicated in Fig. 2. Casing 48 is provided with a suitable cover 53. In fastening the toaster to the cover, the cover may have a plate 54 attached to it provided on its upper surface with an undercut tongue 55 and the bottom of the toaster may be provided with undercut arms 56 having an inside contour shaped to correspond to that of the outside of tongue 55. Thus the toaster may be slid on and off the plate 54, the arms engaging the undercut edges of tongue 55. Since the toaster may be fairly heavy, I preferably provide suitable dampers or dash pots 57 to cushion the opening and closing movements of the toaster and cover.

Utensil 9 may be another receptacle similar to utensil 6 except that it may be twice as long since this cover 16 is shown as being twice as long as the others.

It will be understood that all units are interchangeable. At any time, one type of unit may be replaced by another. Units embodying utensils other than those illustrated may be made available by a manufacturer so that the user may select such utensils as meets his needs and may change utensils from time to time as found desirable.

The cupboard 4 may be provided with a door or doors 59 of any suitable type. In the present instance, the cupboard is divided into two sections and I have shown each section provided with a door similar to that disclosed and claimed in the application of Ray Patten, Serial No. 692,763, filed August 24, 1946, for Wall Cabinet and assigned to my present assignee, which is shaped and hinged to telescope back over the top of the cupboard. The front of the cupboard tapers rearwardly from its bottom toward its top as is indicated at 60 and at its top curves rearwardly as is indicated at 61. Each door 59 is shaped to conform to the contour of the front of the cupboard. This brings the top line of juncture between the upper edge of the door and the top of the cupboard well to the rear of the vertical plane of the lower front edge of the cupboard. Each door is hinged as follows. Rigidly attached to the door at its side edges at a point spaced downwardly from its top is a pair of arms 62. In the present instance, they are shown as being attached to the door by spaced rivets 63. The arms extend through guide slots 64 in front flanges 65 on the cupboard and at their rear ends are pivotally connected to the end walls 66 of the cupboard. The door is suitably counterbalanced, the counterbalance being shown in the present instance in the form of springs 67, although any suitable form of counterbalance may be used. With this arrangement, a door in moving from the closed position shown at the left hand side of Fig. 1 to the open position shown at the right hand side of Fig. 1, telescopes over the top of the cupboard as shown. This serves In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. In a kitchen cabinet, a work table top, a cupboard positioned above the work table top at the rear thereof with its bottom wall spaced vertically from the work table top, a plurality of interchangeable units each comprising a frame, the open front of which slopes rearwardly from its upper edge toward its bottom, a front cover hinged to the frame at its lower edge shaped to conform to the front of the frame, and a utensil mounted on said cover; and means for detachably connecting the frame beneath the bottom wall of the cupboard in spaced relation to the work table top, the distance from the horizontal plane of the hinges to the table top being equal to the distance from the vertical plane of the hinges to the plane of the outermost portion of the cover whereby when a cover is swung down into engagement with the table top, its front end is substantially horizontal.

2. In a kitchen cabinet, a work table top, a cupboard positioned above the work table top at the rear thereof with its bottom wall spaced vertically from the work table top, a plurality of interchangeable units each comprising a frame, the open front of which slopes rearwardly from its upper edge toward its bottom, a front cover hinged to the frame at the lower edge thereof, said cover being shaped to conform to the front of the frame, means for connecting the frame beneath the bottom wall of the cupboard in spaced relation to the work table top, the distance from the horizontal plane of the hinges to the table top being equal to the distance from the vertical plane of the hinges to the plane of the outermost portion of the cover whereby when a cover is swung down into engagement with the table top, the front end portion of said cover is substantially horizontal, a utensil, and hinge means connecting the utensil to the frame whereby the utensil may be positioned horizontally, vertically, or in an intermediate position with respect to the downwardly swung cover.

3. In a kitchen cabinet, a work table top, a cupboard positioned above the work table top at the rear thereof with its bottom wall spaced vertically from the work table top, a plurality of interchangeable units each comprising a frame, the open front of which slopes rearwardly from its upper edge toward its bottom, and a front cover hinged to the frame at its lower edge shaped to conform to the front of the frame; means for detachably connecting the frame beneath the bottom wall of the cupboard in spaced relation to the work table top, the distance from the horizontal plane of the hinges to the table top being equal to the distance from the vertical plane of the hinges to the plane of the outermost portion of the cover whereby when a cover is swung down into engagement with the table top, its front end is substantially horizontal, and a utensil carried by the respective frames, some of said utensils being mounted on the cover and others hinged to the rear portion of the associated frame.

4. In a kitchen cabinet, a work table top, a cupboard positioned above the work table top at the rear thereof with its bottom wall spaced vertically from the work table top, a plurality of interchangeable units each comprising a frame, the open front of which slopes rearwardly from its upper edge toward its bottom and a front cover hinged to the frame at its lower edge shaped to conform to the front of the frame, means for detachably connecting the frame beneath the bottom wall of the cupboard in spaced relation to the work table top, the distance from the horizontal plane of the hinges to the table top being equal to the distance from the vertical plane of the hinges to the plane of the outermost portion of the cover whereby when a cover is swung down into engagement with the table top the front end portion of said cover is substantially horizontal, a utensil, and hinge means connecting the utensil to the frame comprising a toggle hinge pivoted at one end to the frame and at the other end to the utensil whereby the utensil may be positioned vertically, horizontally, or in an intermediate position with respect to the downwardly swung cover.

5. In a kitchen cabinet, a work table top, a cupboard positioned above the work table top at the rear thereof with its bottom wall spaced vertically from said table top, a plurality of units each comprising a frame having an open front which extends downwardly and rearwardly from its top toward its bottom, a cover for said open front hinged to the frame at the lower edge thereof, means for securing an appliance within said frame to be concealed by said cover when the latter is in closed position, and means for securing said frame beneath the bottom wall of the cupboard in spaced relation to the work table top, the distance from the horizontal plane of the cover hinge to the table top being equal to the distance from the vertical plane of the hinge to the plane of the outermost portion of the cover whereby when the cover is swung down into engagement with the table top the front end portion of said cover is substantially horizontal with the appliance available for the normal operation thereof while remaining secured relative to said frame, said cover providing a stable base for the appliance or an accessory operatively associated therewith.

ALAN TOMPKINS.

REFERENCES CITED

The following references are of record in the file of this patent:

UNITED STATES PATENTS

| Number | Name | Date |
| --- | --- | --- |
| 670,793 | Lippincott | Mar. 26, 1901 |
| 780,938 | Clarke | Jan. 24, 1905 |
| 911,159 | Ridley | Feb. 2, 1909 |
| 1,206,513 | Coppes | Nov. 28, 1916 |
| 1,215,261 | Dyke | Feb. 6, 1917 |
| 1,582,823 | Jones | Apr. 27, 1926 |
| 1,590,692 | Lewis | June 29, 1926 |
| 2,194,333 | Thompson | Mar. 19, 1940 |

FOREIGN PATENTS

| Number | Country | Date |
| --- | --- | --- |
| 11,217 | France | Nov. 6, 1909 |
| 105,433 | Austria | Jan. 25, 1927 |